United States Patent [19]

Abe et al.

[11] Patent Number: 4,552,780
[45] Date of Patent: Nov. 12, 1985

[54] MULTI-LAYER COATING METHOD BASED ON DIFFERENTIAL SPECTRAL REFLECTANCE

[76] Inventors: Yoshiaki Abe, 12-352 Yuden, Iseda-cho, Uji-shi, Kyoto-fu; Masaaki Koyama, 8-5, Ishiki-cho, 2-chome, Kariya-shi, Aichi-ken, both of Japan

[21] Appl. No.: 536,762

[22] Filed: Sep. 27, 1983

[51] Int. Cl.$^4$ .............................................. B05D 3/02
[52] U.S. Cl. ........................................ 427/8; 356/402; 427/407.1
[58] Field of Search ...................... 356/402, 405, 406; 427/407.1, 8; 209/580

[56] References Cited

U.S. PATENT DOCUMENTS

| | | | |
|---|---|---|---|
| 3,690,771 | 9/1972 | Armstrong, Jr. et al. | 356/405 |
| 3,916,168 | 10/1975 | McCarty et al. | 356/405 X |
| 4,273,690 | 6/1981 | Walus | 427/407.1 X |
| 4,416,940 | 11/1983 | Loye et al. | 427/407.1 X |

FOREIGN PATENT DOCUMENTS

| | | | |
|---|---|---|---|
| 2452113 | 6/1976 | Fed. Rep. of Germany | 356/402 |
| 1109642 | 4/1968 | United Kingdom | 356/402 |

Primary Examiner—Thurman K. Page
Attorney, Agent, or Firm—Wenderoth, Lind & Ponack

[57] ABSTRACT

The invention provides a method for forming a multi-layer coating comprising applying over a colored intercoat a low hiding, colored top coat at incomplete hiding, thereby obtaining a color very similar to that of a top coat applied at complete hiding power. This invention also provides a simple way for determining an appropriate intercoat color for a given top coat color.

1 Claim, 9 Drawing Figures

MULTI-LAYER COATING METHOD BASED ON DIFFERENTIAL SPECTRAL REFLECTANCE

FIELD OF INVENTION

The present invention relates to a method for forming a multi-layer coating and more specifically, concerns a method for forming a multi-layer coating comprising applying over a colored inter coat a low hiding, colored top coat at incomplete hiding so as to minimize the color difference as compared with the case when a top coat is applied which has complete hiding power. The invention provides the simplest way for determining an appropriate intercoat color for a given top coat.

BACKGROUND OF THE INVENTION

In a coating area, a top coat is usually applied over an intercoat (or underlying coat) at complete hiding, i.e. to cover up the same. At this time, since the hiding power differs considerably from pigment to pigment, the actual top coat thickness likewise varies in a considerable range from coating to coating. If a low hiding paint composition whose hiding power is in the order of about 50~250μ as expressed herein in terms of film thickness required for hiding the JIS contrast chart (reflectance of white substrate: Rw=80±1%; reflectance of black substrate: RB≦2%) by the visual judgement, is to be applied as a top coat, repeated and somewhat complicated coating operations are always required. This also means the process is very time consuming and hence is not practicable.

Even in the case using a higher hiding paint composition, if the substrate is of a complicated structure and there are hidden portions on the substrate which make it difficult to thoroughly coat the substrate, it is not possible to cover up the whole area equally and there often results a lack of hiding from portion to portion. If one wishes to effect complete hiding, then there results a problem of sagging at the other portions because of excessive coating applied thereupon. Therefore, it is very difficult to hide thoroughly the intercoat with a normal coating application thickness of 30 to 40μ.

On the other hand, a highly chromatic coating has been welcomed in the market in recent years. Since most of the organic pigments used in such coating have fairly low hiding power, considerable quantities of such pigment must be added to the top coat composition providing resulting in complete hiding on the intercoat with a film thickness of about 30~40μ. Employment of such a larger quantities of pigment, however, may cause additional problems, under normal conditions, in that the painted film lacks gloss the painting composition becomes highly viscose and the coating exhibits poor weather resistance. Therefore, in such a case we cannot help but use coatings which incompletely hide the substrate to some extent, and for this reason, we are forced to select the same or a somewhat similar colored intercoat for a given colored top coat. However, there is no established selection standard of such intercoat and therefore, at the time when each different kind of pigment is to be used in the intercoat and in the top coat, we cannot but rely on a trial and error system for determining the appropriate color combination. Such procedure is indeed a time-consuming and inefficient one.

Furthermore, since the colored intercoat does include a higher concentration of pigment of the same, or substantially the same hue as with that of the top coat, there is a serious problem of raising up the cost as a matter of course. Therefore, if an appropriate intercoat color, which exhibits a small color difference between a composite coating having a top coat of low hiding power applied at 30~40μ thickness, i.e. so as to exhibit incomplete hiding characteristics, over the intercoat and a coating having the same top coat applied at complete hiding, can be easily determinable from a wider range of colors. This would be highly advantageous in many ways. Thus, it would be only beneficial in widening the color gamut of the top coat, thereby opening the way for making use of such low hiding pigments previously believed to be unsuitable for use as a top coat because there was no known color which was adequate for intercoat, and also useful in shortening the time duration required for the selection of an appropriate intercoat color for a given top coat, for lowering the cost of inter and top coats due to decreasing the amount of the pigment and shortening the application time or the like.

This invention has been made to overcome the aforementioned disadvantages.

SUMMARY OF THE INVENTION

According to the invention, there is provided a method for forming a highly chromatic, multi-layer coating of a red (Munsell renotation hue R series), a yellow (Munsell renotation hue Y series) or an orange (Munsell renotation hue YR series) color comprising applying over a colored intercoat a low top coat having low hiding power so as to incompletely hide the intercoat to give a color difference of less than 1.0 as compared with a color of the same top coat applied at complete hiding, which is characterized in that the intercoat color is selected so as to fulfill the requirement:

$$\Sigma |\Delta R\lambda| \leq 0.5$$

wherein $\Sigma|\Delta R\lambda|$ stands for the summation of absolute values of $\Delta R\lambda$, and $\Delta R\lambda$ is the differentia between spectral reflectance (RMλ) of the top coat applied at complete hiding and the spectral reflectance (RGλ) of the intercoat applied at complete hiding at the respective wave length (λ) at intervals of 20 nm in the selected wavelength region ranging from the point, at which the reflectance difference, at the same wavelength, in the spectral reflectance curves over the white substrate and black substrate of the JIS contrast chart of the top coat applied at incomplete hiding and in a defined film thickness, is more than 1% to 700 nm, and the requirement that the reflectance curves of a complete hiding top coat and of a complete hiding intercoat will become approximately near each other only in the abovementioned selected wavelength region.

DESCRIPTION OF THE PREFERRED EMBODIMENTS

Numerous difficulties have been encountered in having a highly chromatic coating of red, yellow and orange because such colored pigments are in general low hiding, The inventors have attempted to find out a simplified method for determining an optimum color of an intercoat for a given low hiding top coat, said intercoat being such that even if the low hiding top coat is applied at about 30~40μ thickness, i.e. at incomplete hiding over said coating, thereby allowing to see the color of said intercoat through the coat, no color difference can be detected visually as compared with the color of the top coat applied at complete hiding, in other words when said color difference is less than 1.0, the inventors have have arrived at present invention.

It is, therefore, to be understood correctly that the invention has been made on the premise that the intercoat color be selected from somewhat similar colors with that of the top coat. However, by the term "similar color", we do not intend to mean the same or substantially same color in very strict sense as heretofore being used in the related field, but to mean an approximate color by the mere visual and primary selection as, for example, red in a red series, yellow in a yellow series and the like.

In the present invention, the requirements for the intercoat color to a given top color of red, yellow or orange series are settled as follows: First of all, the intercoat color must fulfill the requirement:

$$\Sigma |\Delta R\lambda| \leq 0.5$$

wherein $\Sigma |\Delta R\lambda|$ stands for the summation of absolute values of $\Delta R\lambda$ and $\Delta R\lambda$ is the differentia between the spectral reflectance (RMλ) of the top coat applied at complete hiding and the spectral reflectance (RGλ) of the intercoat applied at complete hiding at the respective point at intervals of 20 nm in the selected wavelength region ranging from the point at which the reflectance difference, at the same wavelength, in the spectral reflectance curves over the white and black substrates of the JIS contrast chart of the top coat applied at incomplete hiding and at a defined film thickness, is more than 1% to 700 nm.

The other requirement is such that the reflectance curves of the complete hiding top coat and of the complete hiding intercoat come approximately near each other in the abovesaid wavelength region only.

Figure 1:
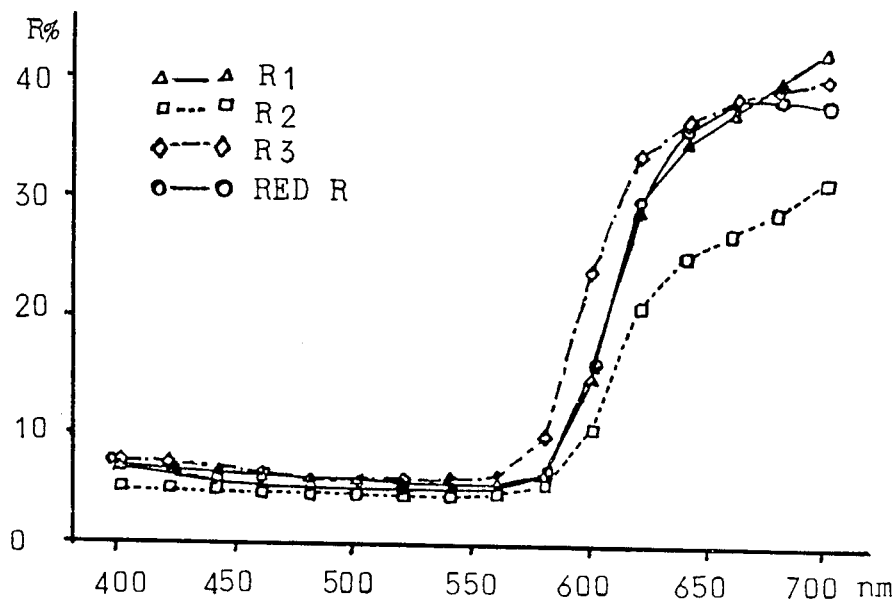
FIGS. 1, 3 and 5 represent spectral reflectance curves in which Red R, Orange OR and Yellow Y top coats are applied at complete hiding conditions onto red ($R_1 \sim R_3$), orange ($OR_1 \sim OR_4$) and yellow ($Y_1$, $Y_6$, $Y_7$ and $Y_8$) intercoats, respectively.
Figure 3:
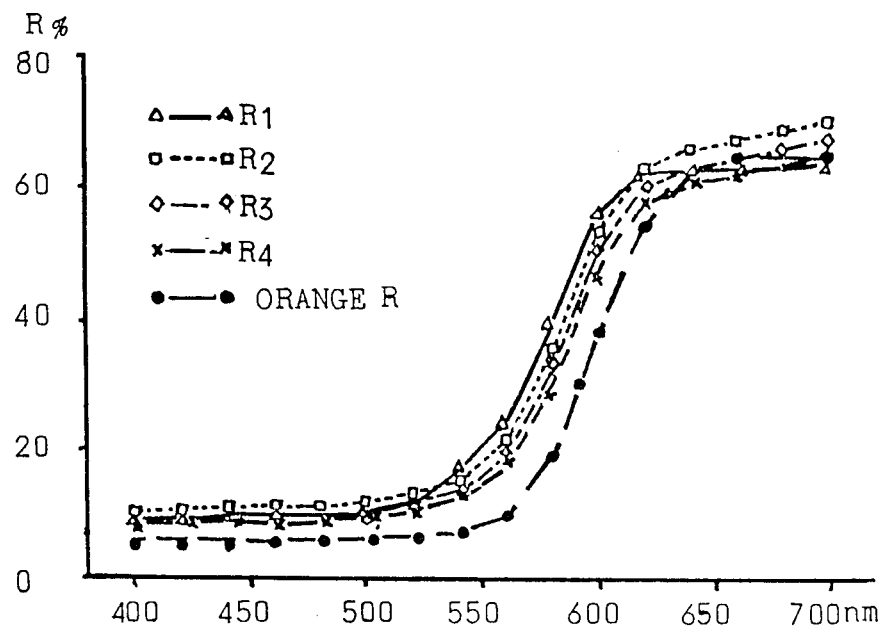
Figure 5:
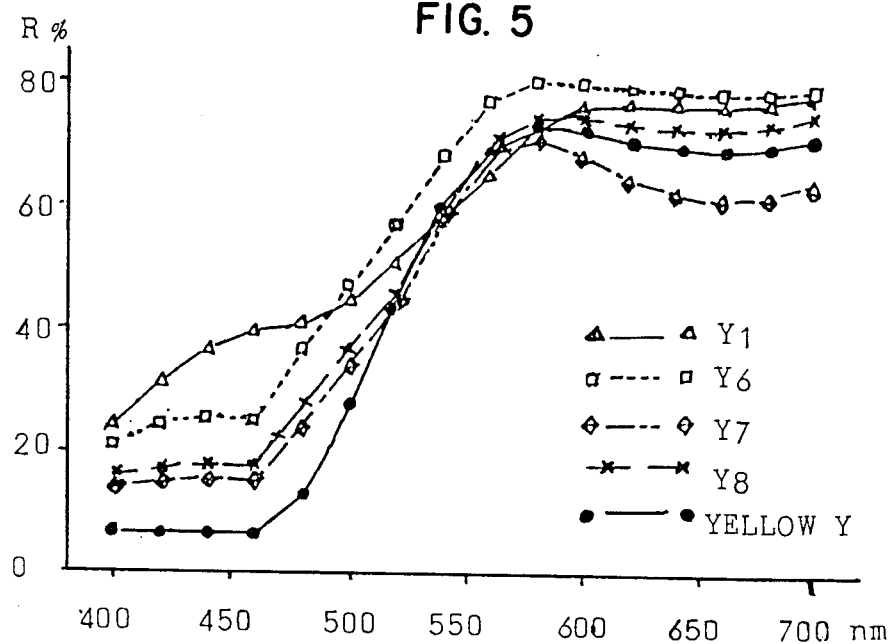

It is to be understood that the abovesaid wavelength region will be naturally varied with the color shade of the top coat and hiding power of the pigment used. When each of a colored top coat composition and the similar colored intercoat composition are applied each at complete hiding conditions over the respective substrate and the spectral reflectance curves are made on the same chart, very similar curves are obtained as a matter of course as shown in FIGS. 1, 3 and 5, wherein RED R, ORANGE OR and YELLOW Y are of top coat composition, and $R_1 \sim R_3$, $OR_1 \sim OR_4$, and $Y_1$, $Y_6$, $Y_7$ and $Y_8$ are red, orange and yellow colors for the intercoats.

Figure 7:
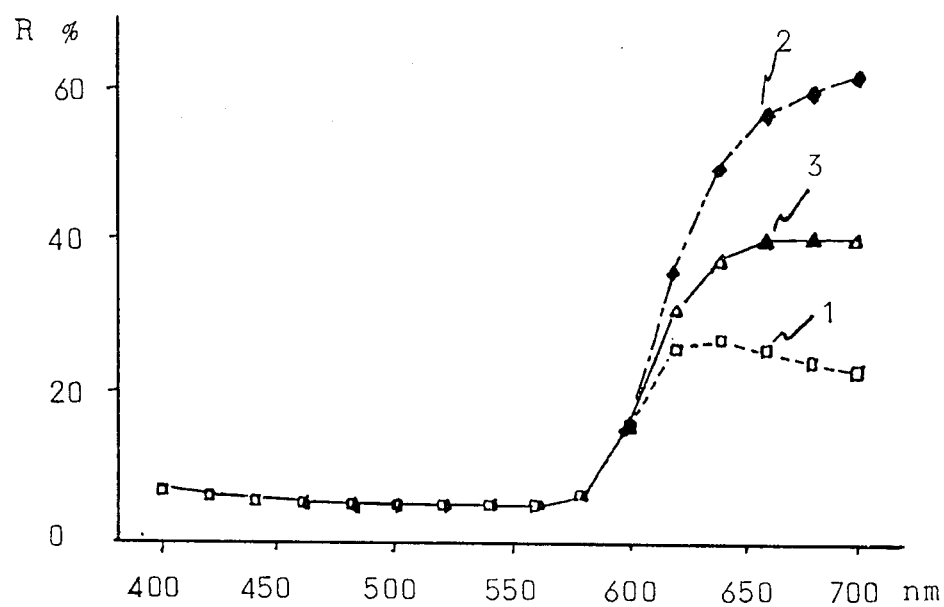
FIGS. 7, 8 and 9 show the spectral reflectance curves for red, yellow and orange colored top coats applied at a defined thickness at incomplete hiding conditions over white and black substrates.
Figure 8:
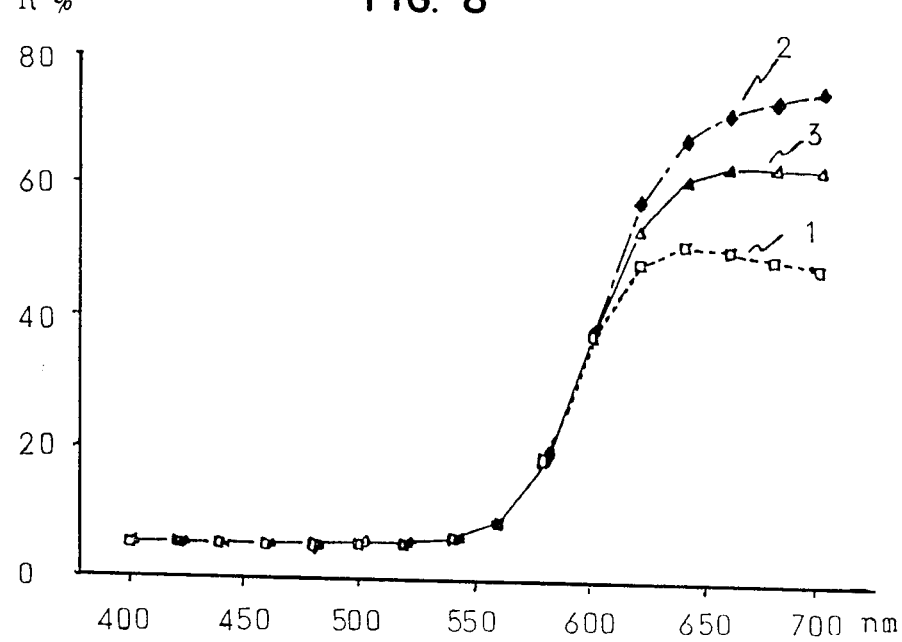
Figure 9:
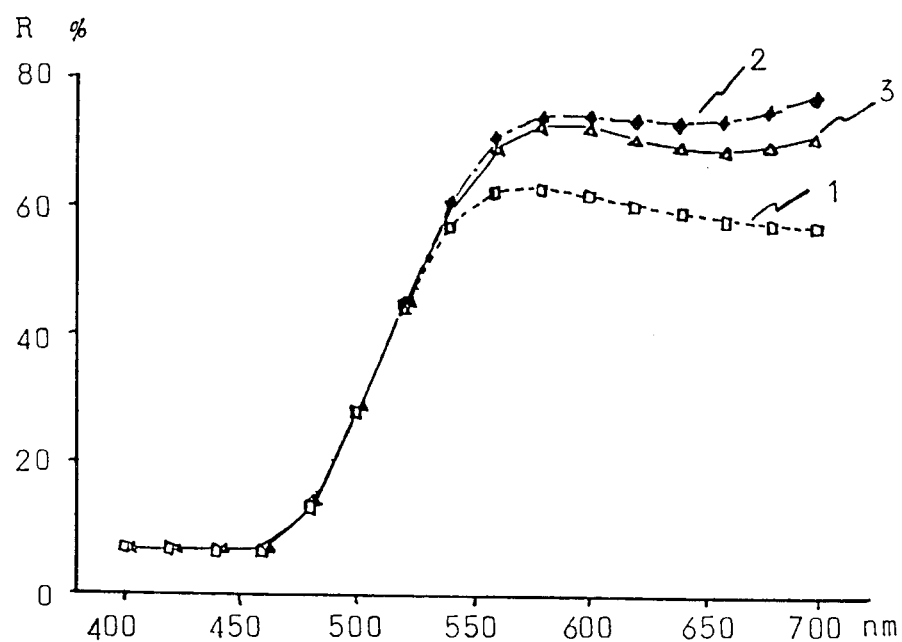

On the other hand, the spectral reflectance curves for red, yellow and orange colored top coats applied at a defined film thickness (30~40μ) under incomplete hiding conditions over the white and black substrates of a JIS contrast chart are as given in FIGS. 7, 8 and 9, wherein the mark □—□ stands for incomplete hiding over the black substrate; — for incomplete hiding over the white substrate; and △—△ for complete hiding of the top coat. In such a curve, substantially horizontal portions at the lower part stand for the light absorption region and from the rising portion downward is the light reflection region. As clearly known from FIGS. 7~9, since the reflectance curves over the white substrate are almost in accord with those over the black substrate at the light absorption region, there would be no substantial effect of the underlying on the color of the top coat in this region. Whereas, at the light reflection region, these curves (over the white and black substrates) get separated from each other after certain point, and it is, thus, clear that the wavelength region in which the intercoat will give effect on the top coat is from this diverging point to 700 nm. Supposing a reflectance difference of below 1% at the same wavelength in the reflectance curves over the white and black substrates will indicate no significant difference in substance, the wavelength region in which the intercoat will give substantial effect on the color shade of the top coat is, in either the case of red, yellow and orange colored top coats, a longer wavelength region ranging from the point at which the reflectance difference at the same wavelength in the spectral reflectance curves over the white and black substrates is more than 1%, to a maximum of 700 nm. In other wavelength regions, there is no substantial effect of the color of intercoat on the color shade of the top coat. More specifically, such longer wavelength region is 620~700 nm for RED R, 600~700 nm for ORANGE OR and 540~700 nm for YELLOW Y.

Ideally, the spectral reflectance curves of the top coat and of the inter coat each applied at complete hiding should coincide with each other. However, in general, each different pigment is used in the respective coating and hence it is almost impossible to have coincident reflectance curves. Therefore, in the selection of an appropriate color for a given intercoat, the question is to what extent the spectral reflectance curve of the intercoat may deviate from that of the top coat in that longer wavelength region only.

The inventors then tried to calculate the summation of absolute values of $\Delta R\lambda(\Sigma|\Delta R\lambda|)$, $\Delta R\lambda$ being the differential between the spectral reflectance (RMλ) of the top coat applied at complete hiding and the spectral reflectance (RGλ) of the intercoat applied at complete hiding at the respective point at intervals of 20 nm in the abovesaid longer wave length region for each selected colored top and intercoats.

By the way, when a top coat is to be applied at a defined thickness at incomplete hiding over an intercoat, it is very convenient and suitable to evaluate the employable intercoat by checking the color difference between the color of the composite coating and the color of top coat applied at complete hiding. Such a color difference can be determined by using a differential colorimeter or spectrophotometer.

Figure 2:
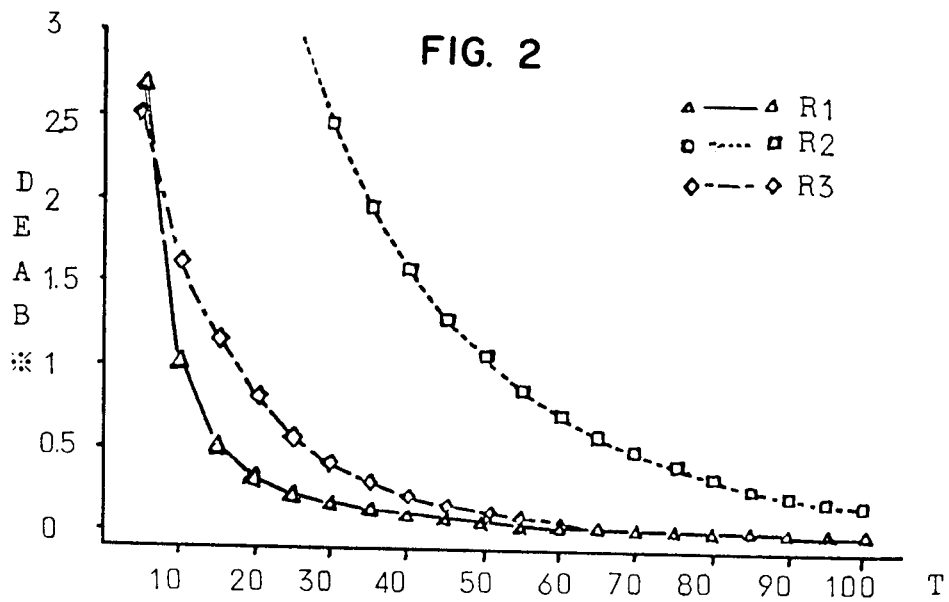
FIGS. 2, 4 and 6 show the correlation between the determined color difference ΔE*ab and the top coat thickness T in which the same color top coats are applied at incomplete hiding conditions onto the same intercoats as in FIGS. 1, 3 and 5. In these figures, intercoats capable of giving a determined color difference ΔE*ab of less than 1 are especially appropriate for the respective top coats.
Figure 4:
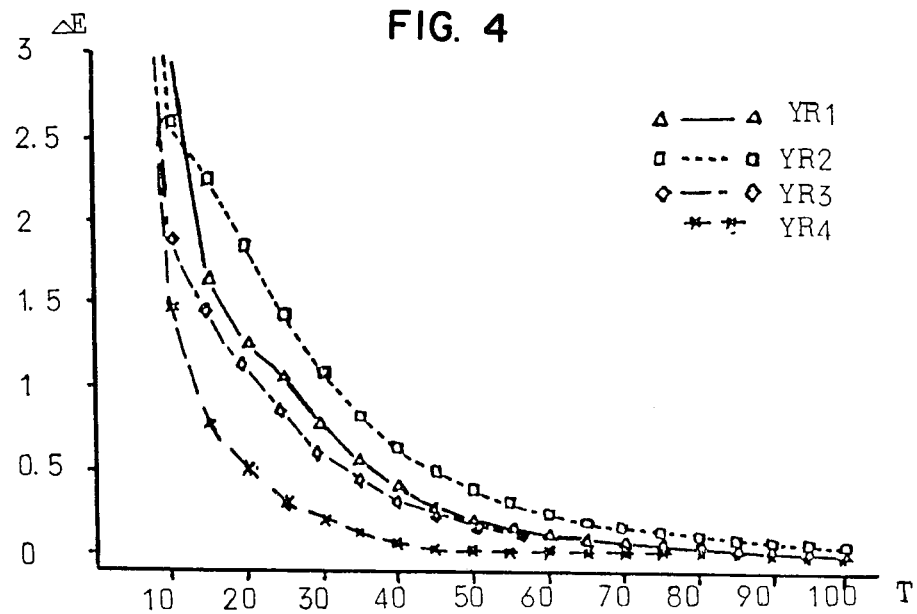
Figure 6:
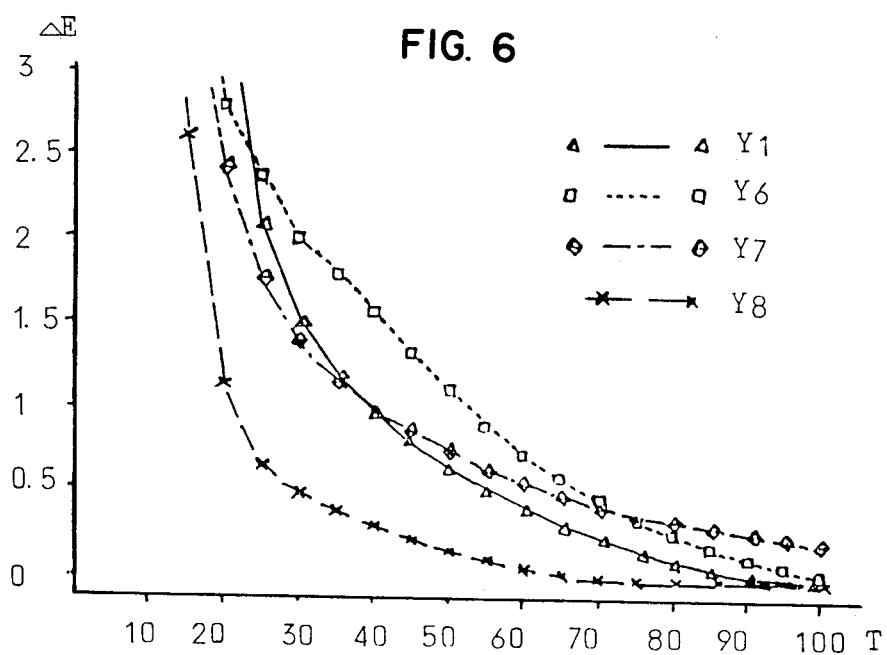

The inventors, therefore, have actually determined for each selected combination of inter and top coat, the respective color difference ΔE*ab (color difference according to CIELAB color difference formulae) between the color of the composite coating having the top coat applied at thickness T (5~100μ) over the intercoat and the color of the same top coat applied at complete hiding, and the thus obtained results are shown in FIGS. 2,4 and 6. In these figures, the employed top and intercoats correspond to those of FIGS. 1, 3 and 5, respectively, and there show the correlation between the determined color difference ΔE*ab and the top coat thickness T. In this invention, a low hiding top coat is to be applied at incomplete hiding, usually at a film thickness of 30 to 40μ, over an intercoat. Therefore, in FIGS. 2, 4 and 6, only the intercoats capable of giving ΔE*ab of less than 1.0 at a film thickness ranging 30-40μ may be said to be appropriate for the designated top coat. From this point of view, the thus obtained results are summarized and evaluated hereinunder. (See Table 1)

TABLE 1

| Top coat | Intercoat | $\Sigma\|\Delta R\lambda\|$ | suitability as intercoat from the criteria of 40μ thickness of top coat and color difference of less than 1.0 |
|---|---|---|---|
| RED R | $R_3$ | 0.076 | suitable |
| (hiding | $R_1$ | 0.087 | suitable |
| power | $R_5$ | 0.091 | suitable |
| 130μ) | $R_2$ | 0.469 | suitable |
|  | $R_4$ | 0.52 | not suitable |
| ORANGE OR | $OR_6$ | 0.122 | suitable |
| (hiding | $OR_4$ | 0.188 | suitable |
| power | $OR_5$ | 0.203 | suitable |
| 165μ) | $OR_3$ | 0.230 | suitable |
|  | $OR_1$ | 0.293 | suitable |
|  | $OR_2$ | 0.397 | suitable |
| YELLOW Y | $Y_5$ | 0.107 | suitable |
| (hiding | $Y_4$ | 0.122 | suitable |
| power | $Y_8$ | 0.219 | suitable |
| 200μ) | $Y_7$ | 0.439 | suitable |
|  | $Y_1$ | 0.454 | suitable |
|  | $Y_6$ | 0.653 | not suitable |
|  | $Y_3$ | 0.882 | not suitable |
|  | $Y_2$ | 0.989 | not suitable |

As is clear from the foregoing, when a low hiding top coat of red, orange and yellow color is applied at about 30~40μ thickness over a similar colored intercoat, an excellent composite coating giving a color difference of less than 1.0 as compared with the color of top coat applied at complete hiding can be attained only with the intercoat fulfilling the requirement of:

$$\Sigma|\Delta R\lambda| \leq 0.5$$

Thus, the invention has been made on the basis of such finding that the summation of absolute values of the differentiae between the spectral reflectance of the top coat applied at complete hiding and the spectral reflectance of the intercoat applied at complete hiding at the respective wavelength of intervals of 20 nm in the selected wavelength region inherent to the respective color is indeed useful as a criterion for the selection of an intercoat color for a given top coat and that in other wavelength region, the intercoat color will give no substantial effect on the color shade of the top coat.

According to the invention, it is quite easy to find out the most appropriate intercoat color for a given top coat. Furthermore, a range of suitable colors may be easily determined either by repeating experiments or by using a computer color matching technique, and the most economic and advantageous color pigment may be selected therefrom without any difficulty.

Though the invention has been explained in connection with the solid color, the invention may likewise be applicable to the top coat with the so-called metallic coating composition (e.g. 2 coats-1 bake system).

What is claimed is:

1. In a method for forming a highly chromatic, multi-layer colored coating of a red Munsell renotation hue R series, a yellow Munsell renotation hue Y series or an orange Munsell renotation hue YR color series comprising applying over a colored intercoat, under incomplete hiding conditions, a low hiding top coat so as to give a color difference of less than 1.0 as compared with the case in which the top coat is applied under complete hiding conditions, the improvement, wherein the intercoat color is selected so as to fulfill the requirement;

$$\Sigma|\Delta R\lambda| \leq 0.5$$

wherein $\Sigma|\Delta R\lambda|$ stands for the summation of absolute values of $\Delta R\lambda$, and $\Delta R\lambda$ is the differential between the spectral reflectance (RMλ) of the top coat applied at complete hiding and spectral reflectance (RGλ) of the intercoat applied at complete hiding at the respective wavelength (λ) at intervals of 20 nm in the selected wavelength region ranging from the point at which the reflectance difference at the same wavelength in the spectral reflectance curves over the white and black substrates of a JIS contrast chart of the top coat applied at incomplete hiding and at a defined film thickness is more that 1% to a maximum of 700 nm, and whereby the reflectance curves of the complete hiding top coat and of the complete hiding intercoat are approximately near each other in the above said selected wavelength region only.

* * * * *